United States Patent
Stubbs et al.

(10) Patent No.: US 8,278,244 B2
(45) Date of Patent: *Oct. 2, 2012

(54) LASER MARKING OF SUBSTRATES

(75) Inventors: Brian Stubbs, Norwich (GB); William Green, Widnes (GB)

(73) Assignee: Datalase Ltd, Widnes (GB)

( * ) Notice: Subject to any disclaimer, the term of this patent is extended or adjusted under 35 U.S.C. 154(b) by 1094 days.

This patent is subject to a terminal disclaimer.

(21) Appl. No.: 12/090,571

(22) PCT Filed: Oct. 23, 2006

(86) PCT No.: PCT/GB2006/003945
§ 371 (c)(1),
(2), (4) Date: Aug. 4, 2008

(87) PCT Pub. No.: WO2007/045912
PCT Pub. Date: Apr. 26, 2007

(65) Prior Publication Data
US 2009/0117353 A1    May 7, 2009

(30) Foreign Application Priority Data

Oct. 21, 2005 (GB) .................................. 0521513.2

(51) Int. Cl.
*B41M 5/50* (2006.01)
(52) U.S. Cl. .................. 503/201; 430/200; 430/945
(58) Field of Classification Search .................. None
See application file for complete search history.

(56) References Cited

U.S. PATENT DOCUMENTS

| 2,336,299 | A | 12/1943 | Russell |
| 2,855,266 | A | 10/1958 | James |
| 3,125,438 | A | 3/1964 | Franklin et al. |
| 3,161,770 | A | 12/1964 | Huett et al. |
| 4,847,184 | A | 7/1989 | Taniguchi et al. |
| 5,035,983 | A | 7/1991 | Kiyonari et al. |
| 5,063,137 | A | 11/1991 | Kiyonari et al. |
| 5,472,930 | A | 12/1995 | Podszun et al. |
| 5,578,120 | A | 11/1996 | Takahashi et al. |
| 6,210,472 | B1 | 4/2001 | Kwan et al. |
| 7,939,101 | B2 * | 5/2011 | Obae et al. ..................... 424/465 |
| 8,048,605 | B2 * | 11/2011 | Khan et al. ................. 430/270.1 |
| 2004/0261663 | A1 | 12/2004 | Yamada et al. |
| 2005/0186511 | A1 | 8/2005 | Khan |
| 2005/0231585 | A1 * | 10/2005 | Mudigonda et al. .......... 347/238 |

FOREIGN PATENT DOCUMENTS

| GB | 1 400 434 A | 7/1975 |
| GB | 1 522 918 A | 8/1978 |
| JP | 01-222995 | 9/1989 |
| JP | 11-029711 | 2/1999 |
| WO | WO 02/068205 A | 9/2002 |
| WO | WO 2006/067073 | 6/2006 |
| WO | WO 2006/129078 | * 12/2006 |

* cited by examiner

*Primary Examiner* — Bruce H Hess
(74) *Attorney, Agent, or Firm* — Saliwanchik, Lloyd & Eisenschenk

(57) ABSTRACT

A method for marking an substrate, comprising coating the substrate with a white or colorless solution of a soluble alkali or alkaline earth metal salt of a weak acid and irradiating areas of the substrate to be marked such that those areas change color, wherein the substrate comprises a polysaccharide material.

17 Claims, No Drawings

LASER MARKING OF SUBSTRATES

This application is a National Stage Application of International Application Number PCT/GB2006/003945, filed Oct. 23, 2006, which claims priority to Great Britain Application No. 0521513.2, filed Oct. 21, 2005, all of which are incorporated herein in their entirety.

FIELD OF THE INVENTION

This invention generally concerns laser imaging of substrates such as paper, card or board.

BACKGROUND

Recent advances in papermaking have improved the archival properties and the whiteness of paper, card and board. These advances are the result of various modifications including: replacement of yellowish rosin-derived sizes with less coloured, pH neutral or alkaline sizes such as alkyl ketene dimers or alkenylsuccinic acid anhydrides; replacement of acidic papermaking waters with pH neutral or slightly alkaline waters; and replacement of yellowish clay fillers with less coloured calcium carbonate fillers.

There remains a need for a method of imaging of substrates such as paper, card and board that shows effective marking in response to irradiation by laser light, but which also maintains the storage-stable near-whiteness of modern papers in unmarked areas, and also prior to marking.

SUMMARY OF INVENTION

According to the present invention, a method for marking a substrate comprises the steps of coating the substrate with a white or colourless solution of a soluble alkali or alkaline earth metal salt of a weak acid, and irradiating areas of the substrate to be marked such that those areas change colour. The substrate comprises a polysaccharide material, preferably a cellulosic material such as cellulose.

This invention further relates to marked paper, card or board obtainable by the method of the invention.

DETAILED DESCRIPTION OF THE INVENTION

The method of the invention begins with coating the substrate to be marked with a white or colourless solution of a soluble alkali or alkaline earth metal salt of a weak acid. In this invention, the term "weak acid" is characterised as an acid having a $pK_a$ of 3 to 12, e.g. 3 to 7. Preferably the white or colourless solution is an aqueous solution of a water-soluble alkali or alkaline earth metal salt of a weak acid. Examples of water-soluble alkali or alkaline earth metal salts for use in the invention, hereinafter termed salts, include sodium carbonate, sodium bicarbonate, sodium acetate, tribasic sodium citrate, sodium metaborate, sodium bicarbonate, trisodium phosphate, sodium propionate, disodium malonate, sodium tetraborate, sodium silicate, sodium sulphate, sodium molybdate or potassium molybdate. Preferred salt anions are carbonates, bicarbonates, metaborates, tetraborates, acetates, proprionates, silicates, phosphates and molybdates. Perborates are usable but can sometimes show low water-solubility, and sulphates give good black images but sometimes give off a sulphurous smell. Most preferred salt anions are bicarbonates, carbonates, metaborates, tetraborates, silicates and molybdates. Sodium and potassium cations are preferred and can be used interchangeably with any of the above anions, although alkaline earth cations such as calcium may also be used, for example in the form of calcium acetate. Mixtures of salts may be used, and as demonstrated above suitable salts can be binary metal salts or monometal salts. When a binary metal salt is used, the cation is preferably an alkali metal for example sodium.

The particularly preferred types of alkali or alkaline earth metal salts are water soluble. Similar compounds that although not readily water soluble but are dispersible in aqueous systems can also be used. Indeed similar compounds that are soluble/dispersible in non-aqueous systems can also be used.

All of the above salts may be white or colourless and may be readily applied to a substrate via application of the aqueous solution by well-known means such as coating without substantially changing the substrate's visible appearance. Patches of salt solution on a fraction of the substrate surface may also be fabricated by printing such as flexographic printing, silk-screen printing and/or ink-jet printing. Typically, coating of the substrate to be marked with an aqueous solution of the invention inherently results in surface impregnation of the substrate with the solution.

Suitable substrates for use with the present invention comprise a polysaccharide. A preferred polysaccharide is cellulose. Suitable substrates include paper, card or board made from wood pulp, or a polymeric film. Preferably the substrate is white or pale coloured or even transparent. Suitable paper comprises treated wood fibres, fillers and sizes. The sizing is typically done in alkaline conditions, to avoid reaction of say, $CaCO_3$. Indeed, the present invention preferably avoids the use of acidic/oxidising materials. Other papers such as rice paper and those comprising edible starch can also be used. Substrates comprised of polymeric films such as cellulose film can also be marked. The substrate can also be a woven, non-woven or knitted textile which contains cellulosic fibres. The cellulosic fibres can be cotton, viscose or lyocell and can also be blended with other fibres, either natural such as wool or silk, or man-made such as polyester, acrylic or nylon, or a mixture of both. The substrate can also comprise wood, timber or cork and products made from such substrates.

Once the substrate to be marked is coated with a suitable salt, the coating is allowed to dry, or forcibly dried, by application of heat. It may be useful in some cases to apply heat well in excess of that required for drying, in order to "set" the coating. Such extra heat should, however, be consistent with the avoidance of substrate yellowing and discoloration.

The areas to be marked are irradiated with laser light. Typically, the wavelength of this light is from 800 nm to 10,600 nm. Nd—YAG lasers or $CO_2$ lasers may be used. It may be desirable to use a low-energy laser, such as a diode laser, typically emitting light at a wavelength in the range of 800-1500 nm. In certain circumstances, this energy input may be insufficient to cause effective marking, and in this instance the aqueous solution preferably comprises a suitable IR-absorbent material.

IR-absorbent materials are known. In general terms, any suitable material may be incorporated, for the purposes of this invention, and can be chosen by one of ordinary skill in the art. A preferred IR absorber for use in the invention is a conducting polymer, by which is meant a material that, in the polymerised state, comprises linked monomers (typically rings) that are conjugated and which can therefore allow delocalisation-conduction of position or negative charge. The conjugation allows an absorption shift that can be controlled such that it applies to the wavelength of irradiation, and which may also depend on the concentration of the polymer.

The IR absorbing material can also be a reduced inorganic mixed metal oxide compound, preferably a reduced inorganic mixed metal oxide, such as reduced indium tin oxide or reduced antimony tin oxide. Typically such compounds are non-stoichiometric. The IR absorbing material can also be an organic NIR dye/pigment compound, or an organic polymer. Indeed any substrate that absorbs enough radiation at the wavelength of the laser will be usable. The preferred types of IR absorbers are those that have minimal absorption of visible light and thus appear colourless or nearly colourless.

Alternative IR absorbing materials are metal salts, as described in WO2005/068207 in particular copper (II) hydroxyl phosphate, copper (II) pyrophosphate, copper (II) molybdenum oxide, copper (II) tungsten oxide, iron (III) molybden oxide and iron (III) tungsten oxide.

Without wishing to be limited by theory, irradiation by laser light is thought to cause the heating of the salt and the concomitant release of water from the substrate to be marked, thus giving hydroxide ion formed by salt hydrolysis. Salt hydrolysis is a well-known property of alkali or alkaline earth metal salts of weak acids in aqueous solution, and can be shown to occur by pH measurements. The hydroxide ion is then believed to react with the cellulosic material in the substrate to be marked to give, in the case of cellulose as the cellulosic material, "soda cellulose" (for sodium salts). Additional water is thought to be made during this reaction. Soda cellulose is much more reactive chemically than cellulose and it is therefore believed to darken or blacken on exposure to laser irradiation.

Due to the supposed interaction between the salt and the cellulosic material of the substrate to be marked, it is not necessary for the salt to decompose to a dark product by itself on exposure to laser light. Hence it is preferable that the anion of the salt contains no carbon.

The is simple to implement since the aqueous solutions can be readily and speedily made and applied to the substrate to be marked to give coatings that are then simply dried to give a laser-imagable product. The aqueous solutions are of low viscosity and are readily pumpable. As distinct from dispersions, solutions advantageously do not change in composition through settlement or creaming. Such properties make solutions well suited to semi-continuous operations such as web coating or web printing.

The invention is also cheap to use since the salts used are inexpensive and readily available in a consistent purity. As already referred to, the solutions for use in this invention provide laser-sensitive substrates of substantially unchanged appearance compared to the parent unsensitised object.

Images produced by the method of the invention can be protected by the application of additional layers to improve image rub- and water-resistance. Typically, such layers are coated onto the salt solution layer. As an example, solutions of polymers can be applied which can, for instance, be cross-linked to render images more water and rub-resistant. Alternatively, a polymer may be dissolved in the salt solution to improve water and rub-resistance. Aqueous dispersions of polymers may also be employed either as components of top coats or blended into the salt solution. Suitable dispersions include, but are not limited, to acrylics, styrene-acrylics, polyvinyl acetates, and vinyl acrylics. Examples include the Texicryl® series supplied by Scott-Bader Ltd. Film can also be laminated onto the coated substrate in order to provide image protection via a laminated film, however any adhesive should preferably be substantially transparent to laser radiation.

Whichever form of additional layer is selected, it can be applied either before or after formation of the laser-induced image.

Alternatively, water and rub-resistance can be provided by firstly selecting sodium silicate as the salt to be contained in the aqueous solution, and secondly by adding to the aqueous solution an additional component which is another water-soluble alkali or alkaline earth metal salt of a weak acid, for example sodium metaborate. In this embodiment, the white or colourless aqueous solution containing the sodium silicate and the additional component is applied to the substrate as a single solution and, once dry and optionally set, imparts a gloss to the object being coated and further imparts barrier properties that improve image water and rub-resistance. The applied layer of aqueous solution appears to dry to give a water-insoluble layer or a layer that dissolves in water at a reduced rate compared to a dry sodium silicate layer alone. This method of improving image water and rub-resistance is a "one-pot" method and hence advantageously requires only a single coating operation.

It is also possible to use additional components that are water-dispersible rather than water-soluble, for example zinc oxide, wherein the water-dispersible additional component is dispersed by known means in the sodium silicate solution and then the resulting dispersion is applied to the substrate and dried and optionally set. This method again represents a "one-pot" method.

In contrast to the "one-pot" methods described above, the sodium silicate solution and a solution/dispersion of an additional component (such as sodium metaborate or zinc oxide) can be applied separately. For instance, the sodium silicate solution may be applied first and then dried, and then the solution/dispersion of the additional component can be subsequently applied and then dried. Alternatively, the solution/dispersion of the additional component may be applied first and then dried, and then the sodium silicate solution may be subsequently applied and then dried and optionally set.

Other additives such as fillers, pigments, energy transfer agents, dyes, polymers, tensioactive materials and optical brightening agents can also be added to the aqueous solution of the invention. Suitable polymers can be added, for example to control the rheology of the aqueous solution and hence facilitate coating and/or printing processes or to control penetration and spreading on the object to be coated. Tensioactive materials can be used to aid the wetting of low surface energy supports such as packaging films, coated papers and highly sized papers.

The above described invention will now be illustrated by way of the following Examples 1, 2, 6 and 7 at least.

Example 1

Various aqueous salt solutions were independently coated on separate Xerox paper sheets using an RK 2.5 wire wound coating bar and the coatings were then dried using warm air. The resulting papers were all similar in appearance to the uncoated paper substrate.

When imagewise exposed using a Videojet carbon dioxide 10 W scribing laser emitting 10600 nm IR radiation the papers gave dark text images at between 60% and 40% laser power. At 30% laser power brownish text images were obtained. The materials and results are given in Table 1.

TABLE 1

| Salt | Aqueous Concentration w/w | Text Image Colour | Background Colour | Laser Power/ Imaging range |
|---|---|---|---|---|
| Sodium carbonate | 10% | Black-brown | White | 60%-25% |
| Sodium bicarbonate | 7% | Dark brown | White | 80%-30% |
| Sodium acetate trihydrate | 20% | Black-brown | White | 80%-30% |
| Trisodium citrate dehydrate | 20% | Black-brown | White | 80%-30% |
| Potassium bicarbonate | 20% | Black-brown | White | 80%-40% |
| Sodium chloride | 20% | Pale sepia | White | 60%-30% |
| Sodium metaborate | 10% | Black | White | 60%-30% |

A control test showed that the photocopy paper itself had slight imaging properties on exposure to the laser, giving brownish images at between 60% and 30% power. These images were paler than the image colours exemplified in the table above. In a second control test, the photocopy paper was coated with dionised water using a RK 2.5 wire wound coating bar and then subsequently dried. On laser exposure the appearance and boldness of the images were similar to those obtained with the uncoated paper. The photocopied paper used was filled with calcium carbonate as confirmed by gas evolution on immersion in aqueous acetic acid.

The results in Table 1 show that the alkali metal salts of weak acids gave dark images while sodium chloride (a sodium salt of a strong acid) gave a feeble sepia image. Sodium metaborate gave a black image.

Example 2

Various aqueous solutions of salts were prepared in deionised water. These solutions were then independently coated on separate Xerox paper sheets using an RK 2.5 wire wound coating bar and the coatings were then dried using warm air. The resulting papers were all similar in appearance to the uncoated paper substrate.

When imagewise exposed using a Videojet carbon dioxide 10 W scribing laser emitting 10600 nm IR radiation, some of the papers gave dark text images at between 60% and 40% laser power. At 30% laser power brownish text images were obtained. The materials and results are given in Table 2.

TABLE 2

| Salt | Aqueous Concentration w/w | Text Image Colour | Background Colour | Laser Power/ Imaging range |
|---|---|---|---|---|
| Sodium sulphate | Saturated | Pale Sepia | White | 60%-40% |
| Sodium silicate | 20% | Black/Grey | White | Black 60%-50% Grey 40%-30% |
| Sodium propionate | 20% | Brown-Black | White | 60%-40% |
| Disodium malonate | 20% | Black/Brown-Black | White | Blackish 50%-60% Brown-Black 40% |
| Sodium tetraborate | Saturated | Black | White | 60%-40% |
| Pentasodium triphosphate | 10% | Pale Brown | White | 60%-40% |
| Sodium perborate | Saturated | Brown | White | 60%-30% |
| Trisodium phosphate dodecahydrate | 10% | Brown | White | 60%-30% |
| Sodium trimetaphosphate | 20% | Pale Brown | White | 60%-40% |
| Sodium sulphite | 10% | Black | White | 60%-30% |
| Calcium acetate | 10% | Brown-Black | White | 60%-40% |
| Sodium molybdate dihydrate | 20% | Black | White | 60%-40% |

The results show that sodium sulphate does not provide the desired image intensity. This is because it is the sodium salt of a strong acid. Other compounds not showing the desired intensity were pentasodium triphosphate and sodium trimetaphosphate (forms a slightly acidic solution). A rationalisation of why pentasodium triphosphate forms an alkaline solution, yet does not show the desired intensity, is that it may hydrolyse on laser exposure to give phosphate ion.

Example 3

Sodium metasilicate is a strong alkali and therefore does not form part of the invention. A 30% w/w solution of sodium metasilicate (Aldrich) was prepared in water. It was coated on white photocopy paper using an RK 2.5 wire wound coating bar. A blotchy yellow coating was obtained which was dried using warm air.

When imagewise exposed using a Videojet carbon dioxide 10 W scribing laser the paper gave blackish text images at between 50% and 20% laser power. While a suitable image intensity can be achieved using sodium metasilicate in a concentration of 30% w/w, the coated paper is not similar in appearance to the uncoated paper substrate.

Example 4

Sodium metasilicate is a strong alkali and therefore does not form part of the invention. A 30% w/w aqueous solution of sodium metasilicate was diluted with deionised water to give 10% w/w, 5% w/w and 1% w/w sodium metasilicate solutions. These solutions were then independently coated on separate Xerox paper sheets using an RK 2.5 wire wound coating bar and the coatings were then dried using warm air. The resulting papers were similar in appearance to the uncoated paper substrate.

When Imagewise exposed using a Videojet carbon dioxide 10 W scribing laser emitting 10,600 nm IR radiation the papers made using 10% w/w and 5% w/w sodium metasilicate solution gave blackish text images at between 50% and 30% power, at 20% power the images were brown. The paper made with the 1% w/w solution gave brown images at 50% power. Hence the images produced by 10% w/w, 5% w/w and 1% w/w sodium metasilicate do not exhibit the desired intensity level at low laser power.

Example 5

Sodium hydroxide is a strong alkali and therefore does not form part of the invention. A 20% w/w aqueous solution of sodium hydroxide was prepared in deionised water. It was coated on white photocopy paper using an RK 2.5 bar wire wound coating. A yellow coating resulted which was dried using warm air to give a bright yellow paper surface.

When imagewise exposed using a Videojet carbon dioxide 10 W scribing laser emitting 10,600 nm IR radiation the paper gave blackish text images at between 60% and 40% laser power. At 30% laser power brownish text images were obtained. Hence sodium hydroxide provides neither coated paper that is similar in appearance to the uncoated paper, nor the desired intensity level at low laser power.

Example 6

"One-Pot" Sodium Silicate and Sodium Metaborate System

The effect of variables coating weight (by bar) and sodium metaborate:sodium silicate solution mass ratio on image rub- and wet-resistance were examined. The sodium silicate solution used was obtained from Aldrich. Its formula was given as $Na_2Si_3O_7$ with a $SiO_2$ content of 27%.

In 10 g portions of 1:1 w/w Aldrich sodium silicate solution: deionised water were independently dissolved 0 g (control), 0.25 g, 0.35 g, 0.4 g, 0.5 g and 1.0 g of sodium metaborate (Aldrich). The resulting solutions were coated individually on photocopy sheets, using RK coating bars Nos 1.2, and 2.5, which sheets were then dried using warm air.

The No 1 bar coatings gave improved image rub-resistance as sodium metaborate addition level increased while image wet-resistance was found uniformly poor. The No 2.5 bar coatings all gave good image rub-resistance while wet-resistance improved at higher metaborate addition levels: specifically the 0.35 g, 0.40 g, 0.5 g and 1.0 g ones. The 2-bar coatings were comparable to the 2.5 bar series particularly in that good rub-resistance and fair $CO_2$ laser image wet-resistance were obtained at the higher sodium metaborate addition levels.

Thus higher coating weight improved image physical resistance while increasing metaborate addition level improved image water resistance for the 2 and 2.5 bar-coated papers.

Paper laser sensitivity as measured by black image formation was also much better for the 2.5 bar layers and image blackness increased as metaborate addition level increased.

The sodium silicate/sodium metaborate solutions were applied to microscope slides which were then dried at 90 C for 2 hrs alongside a 50% w/w sodium silicate control slide. The dried slides were then part immersed individually in deionised water for 20 mins in a static test. The slides were then removed, drained and dried at 55 C for 2 hrs.

On visual inspection, the sodium silicate layer control had part dissolved and showed surface disruption while the experimental samples showed markedly reduced dissolution and surface disruption as metaborate levels increased. The sample containing 1 g sodium metaborate crazed on drying, indicating the formation of a brittle glass: as might be expected if the metaborate cross-links or chain extends the silicate. The results indicate progressively increased dried layer water resistance with increased metaborate addition level.

Example 7

Overcoated Sodium Silicate and Sodium Metaborate Systems

A 10% w/w solution of sodium metaborate was applied to photocopy paper using a 2.5 RK coating bar and dried using warm air. This was overcoated with sodium silicate solution (Aldrich) using No 1 RK bar.

The resulting stiffened paper was sensitive to the 10 W $CO_2$ (10,600 nm) IR scribing laser giving black images at 60-40 W with much improved rub- and wet-resistance when compared alongside a non-overcoated control.

Example 8

A 20% w/w solution of sodium metaborate in deionised water (50 ml) was mixed with the aqueous acrylic dispersion product UH-5000 (50 ml (ex. Scott-Bader Ltd)). The ink formulation was drawn down on to natural top liner using an RK 2.5 wire wound coating bar. The coating was dried with warm air.

When imagewise exposed using a Videojet carbon dioxide 10 W scribing laser the substrate had blackish text images at between 60% and 30% laser power.

Example 9

Sodium metaborate (10 g) was dissolved in deionised water (70 g). To this solution copper hydroxyl phosphate (20 g) was added. The mixture was then milled in an Eiger-Torrance bead mill for 15 minutes at 4000 rpm. The resultant ink was drawdown onto Xerox paper sheets using an RK 2.5 wire wound coating bar and then dried with warm air.

The paper was then imaged using a 963 nm diode laser and a 1066 nm fibre laser, both lasers operating with a power output of 3.65 W.

Both lasers were able to induce readable black text images onto the paper.

The invention claimed is:

1. A method for marking a substrate, wherein said method comprises: coating the substrate with a white or colourless solution of a soluble alkali or alkaline earth metal salt of a weak acid; and irradiating areas of the substrate to be marked such that those areas change colour; wherein the substrate comprises a polysaccharide material, wherein the substrate is paper, card, board, or a cellulosic textile.

2. The method according to claim 1, wherein the white or colourless solution is an aqueous solution of a water-soluble alkali or alkaline earth metal salt of a weak acid.

3. The method according to claim 2, wherein the water-soluble salt is a monometal salt.

4. The method according to claim 3, wherein the water-soluble salt is sodium carbonate, sodium bicarbonate, sodium acetate, sodium citrate, sodium metaborate, potassium bicarbonate, sodium phosphate, sodium propionate, disodium malonate, sodium tetraborate, sodium silicate, sodium sulphite, or calcium diacetate.

5. The method according to claim 4, wherein the water-soluble salt is sodium silicate.

6. The method according to claim 5, wherein the aqueous solution or suspension further comprises sodium metaborate or zinc oxide.

7. The method according to claim 3, wherein the water-soluble salt is sodium metaborate.

8. The method according to claim 7, wherein the coating is allowed to dry, or is forcibly dried, and is then further coated with a second aqueous solution of sodium silicate, prior to being irradiated.

9. The method according to claim 1, wherein the polysaccharide material is a cellulosic material.

10. The method according to claim 1, wherein the water-soluble salt is a binary metal salt of an alkali metal.

11. The method according to claim 10, wherein the water-soluble salt is sodium molybdate or potassium molybdate.

12. The method according to claim 1, wherein the coating is allowed to dry, or is forcibly dried, prior to irradiation.

13. The method according to claim 1, wherein the polysaccharide material is cellulose.

14. The method according to claim 1, wherein the aqueous solution includes an IR absorber that absorbs laser light at a wavelength of between 800 nm and 10,600 nm.

15. The method according to claim 14, wherein the IR absorber absorbs laser light at a wavelength of about 1200 nm.

16. The method according to claim 14, wherein the IR absorber is copper hydroxy phosphate or a reduced mixed metal oxide, or an organic dye or polymer.

17. The method according to claim 1, wherein the substrate comprises an alkaline size.

* * * * *